United States Patent [19]

Dressel

[11] 4,172,391
[45] Oct. 30, 1979

[54] DRILL DRIVE MECHANISM

[75] Inventor: Michael O. Dressel, Englewood, Colo.

[73] Assignee: The United States of America as represented by the United States Department of Energy, Washington, D.C.

[21] Appl. No.: 831,727

[22] Filed: Sep. 9, 1977

[51] Int. Cl.$^2$ .............................................. F16G 13/02
[52] U.S. Cl. .................. 74/250 C; 226/172; 175/103; 173/147; 74/243 C
[58] Field of Search ................. 175/103; 173/147, 152; 74/243 C, 243 H, 243 S, 245 C, 246, 250 C, 250 S; 69/23.5, 6.7; 226/172, 173; 214/338, 339

[56] References Cited

U.S. PATENT DOCUMENTS

| 169,642 | 11/1875 | Howard | 74/243 C |
|---|---|---|---|
| 763,255 | 6/1904 | Bunnell | 64/23.6 |
| 2,338,093 | 1/1944 | Caldwell | 64/23.6 |
| 2,690,591 | 10/1954 | Wallace | 226/172 |
| 3,872,932 | 3/1975 | Gosselin | 175/103 |

FOREIGN PATENT DOCUMENTS

| 432968 | 3/1965 | France | 226/172 |
|---|---|---|---|
| 1115954 | 5/1956 | Switzerland | 226/172 |

*Primary Examiner*—Samuel Scott
*Assistant Examiner*—G. A. Anderson
*Attorney, Agent, or Firm*—Dean E. Carlson; Robert C. Smith

[57] ABSTRACT

A drill drive mechanism is especially adapted to provide both rotational drive and axial feed for a drill of substantial diameter such as may be used for drilling holes for roof bolts in mine shafts. The drill shaft is made with a helical pattern of scroll-like projections on its surface for removal of cuttings. The drill drive mechanism includes a plurality of sprockets carrying two chains of drive links which are arranged to interlock around the drill shaft with each drive link having depressions which mate with the scroll-like projections. As the chain links move upwardly or downwardly the surfaces of the depressions in the links mate with the scroll projections to move the shaft axially. Tangs on the drive links mate with notch surfaces between scroll projections to provide a means for rotating the shaft. Projections on the drive links mate together at the center to hold the drive links tightly around the drill shaft. The entire chain drive mechanism is rotated around the drill shaft axis by means of a hydraulic motor and gear drive to cause rotation of the drill shaft. This gear drive also connects with a differential gearset which is interconnected with a second gear. A second motor is connected to the spider shaft of the differential gearset to produce differential movement (speeds) at the output gears of the differential gearset. This differential in speed is utilized to drive said second gear at a speed different from the speed of said gear drive, this speed differential being utilized to drive said sprockets for axial movement of said drill shaft.

11 Claims, 9 Drawing Figures

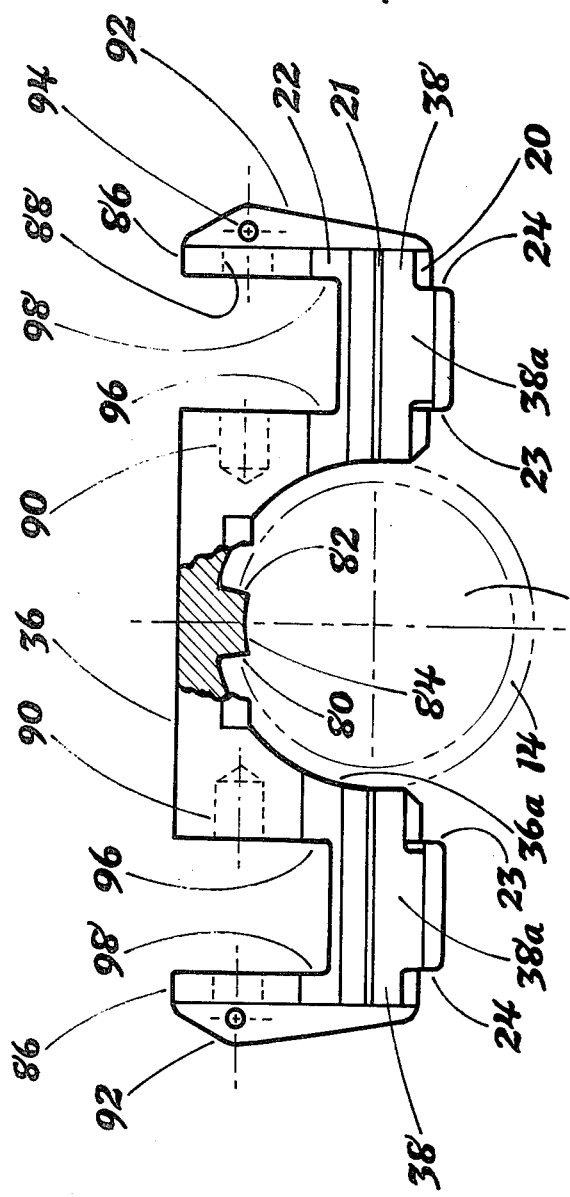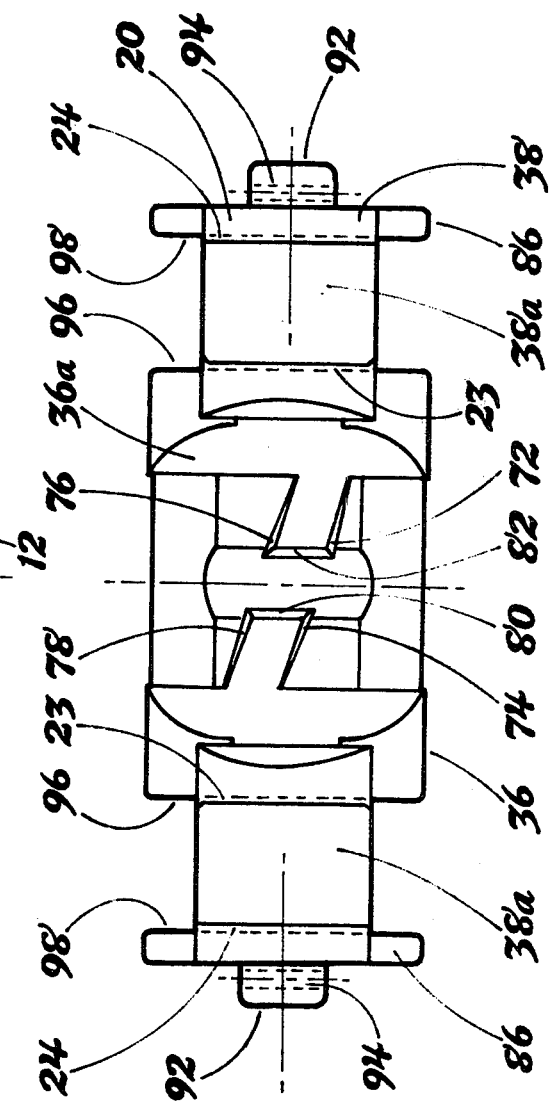

SECTION 9-9

SECTION 8-8

DRILL DRIVE MECHANISM

BACKGROUND OF THE INVENTION

In coal mining and other types of mining, it is frequently necessary for men and machines to operate in mine shafts, the roofs of which must be secured to prevent their caving in. A customary way of securing such mine shaft roofs is to install a large number of roof bolts of substantial diameter and up to ten feet long which, insofar as possible, are anchored in rock. A flexible drill shaft assembly useful in connection with drilling such mine roof holes is described in U.S. application Ser. No. 727,260 filed Feb. 10, 1977, in the name of Horace M. Varner. In addition to the flexible drill shaft assembly described in said application, some means must be provided for rotating this drill shaft as well as for moving it axially. It would be preferable if powered axial and rotational movement of the shaft can be accomplished together or independently, as conditions require. Thus it would be desirable that the drive means be capable, while rotating the shaft, of urging the shaft axially at some desired rate, at a shower rate, or perhaps not at all.

It is known to drive a drill shaft or actuating shaft in an axial direction by means of a chain drive arrangement wherein the chain meshes with the shaft and the shaft moves axially while the drive chain is carried around an endless loop. This arrangement does have the advantage that a number of links of the drive chain may be in contact with the shaft so that the driving force is not concentrated on what may be only a small line contact area on one or two links. The difficulty with this type of arrangement, however, is that it normally requires a backup plate to hold the drill shaft in mesh with the drive chain links. This type of backup plate is quite undesirable in that it adds a substantial amount of friction and wear to the drive mechanism. In U.S. Pat. No. 3,711,161 to Proctor et al is shown a means for axial drive of a beam or jib by means of a pair of coordinated driven chains, each of which has projecting means or teeth which interact with a series of apertures inside of the beam or jib to move it axially. While this double opposed type of chain drive has certain advantages over a single such unit, it would not entirely eliminate the need for backup plates or other means to hold the chain against the driven shaft or some equivalent structure to assure that the drive chain is kept in mesh with the shaft.

DESCRIPTION OF THE DRAWINGS

FIG. 4 is a plan view of one of the drive links shown in FIG. 1;

FIG. 5 is a top view, partly in section, of the drive link of FIG. 4;

DESCRIPTION OF THE PREFERRED EMBODIMENT

Figure 1:
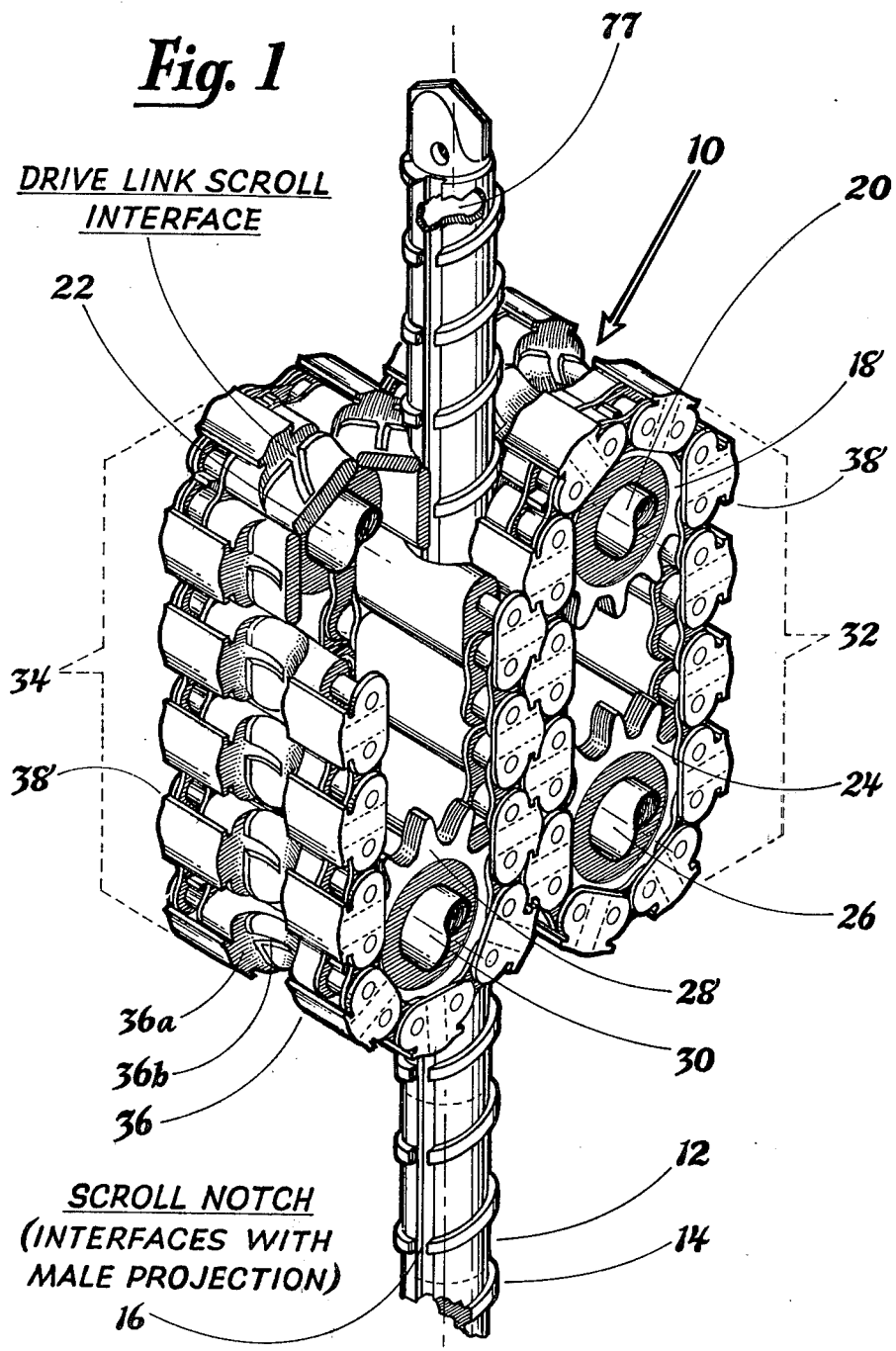
FIG. 1 is a perspective view, shown partly broken away, of a part of a drill drive mechanism incorporating my invention.

FIG. 1 is a perspective view, shown partially broken away for clarity, of the portion of my drill drive mechanism, shown generally at numeral 10, whose function is to provide axial drive of the drill shaft 12. It will be observed that shaft 12 incorporates a series of generally helically arranged projections 14 separated by notches 16 which are axially aligned as the shaft 12 passes through the drive mechanism 10. The shaft 12 may be articulated to facilitate bending when not under load. The drive mechanism includes two pairs of drive sprockets which are driven by means external to the assembly of FIG. 1, of which one such sprocket is shown at numeral 18 carried on a drive shaft 20. A similar sprocket is carried on a drive shaft 22 which is shown broken away to show other parts of the structure. Two additional drive sprockets (not shown) are located at the opposite end of shafts 20 and 22. A set of four idler sprockets are also included, including sprockets 24 on a shaft 26 and sprocket 28 on a shaft 30. As with the drive sprockets, an additional pair of idler sprockets are carried at the opposite ends of shafts 26 and 30.

Carried on the above described sprockets are a pair of roller chains 32 and 34, each of which includes a plurality of drive links 36 including projections 38 arranged to interlink at the center with the links surrounding the drill shaft 12. Each of the drive links 36 is formed with a hollow center section 36a which is adapted to wrap around one half (approximately) of the diameter of the shaft 12. This hollow section includes a pair of internal grooves 36b which mate with the helical projections 14 when the links are interlocked around the shaft 12. Thus, rotation of the drive shafts 20 and 22 results in causing the several grooves 36b to pick up and carry corresponding helical projections 14, thereby moving drive shaft 12 upward or downward depending upon the direction of rotation of the shafts. With several grooves contacting several of the helical projections 14 at all times, excessive loading on any single groove or projection is avoided.

Figure 2:
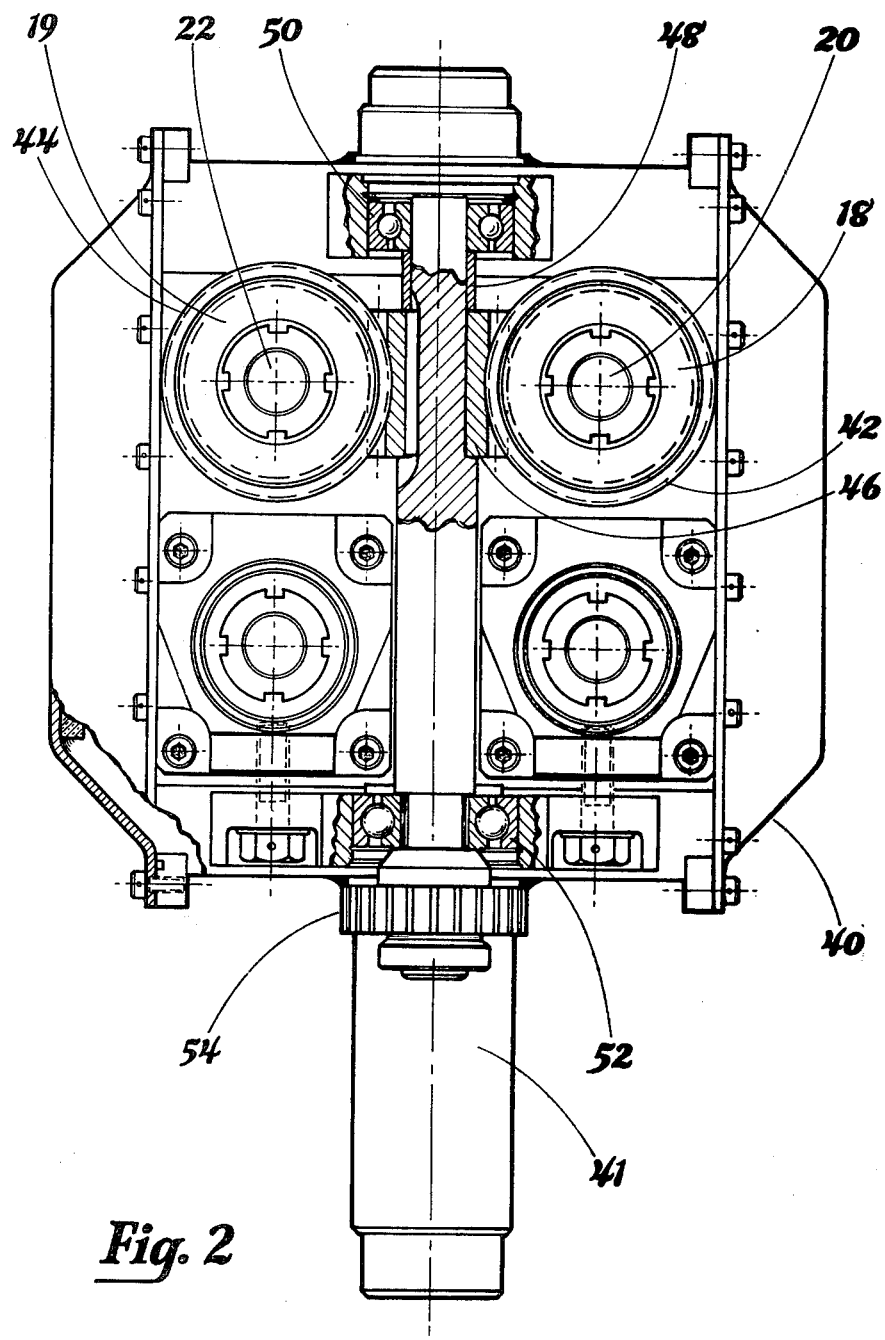
FIG. 2 is a side view, partly in section and partly broken away, showing a portion of the drill drive mechanism of FIG. 1 not visible in FIG. 1.

The entire drive mechanism 10 is carried in a housing 40 supported on a rotatable shaft 41 shown in FIG. 2 which is part of a larger support and drive structure, described below. FIG. 2 is drawn partly in section and with part of the bearing cap and worm gear removed to show that worm shaft 48 is continuous. Drive sprockets 18 and 19 appear in phantom since they are behind a pair of drive gears 42 and 44 carried on shafts 20 and 22, respectively. Gears 42 and 44 are meshed with a worm gear 46 carried on a shaft 48 which is supported in bearings 50 and 52 in housing 40. Shaft 48 is driven by a gear 54 on its lower end which is, in turn, driven by a gear drive system, described below, which rotates the entire housing 40 for rotational drive of drill shaft 12 as well as driving shaft 48 to provide axial feed of shaft 12.

Figure 3:
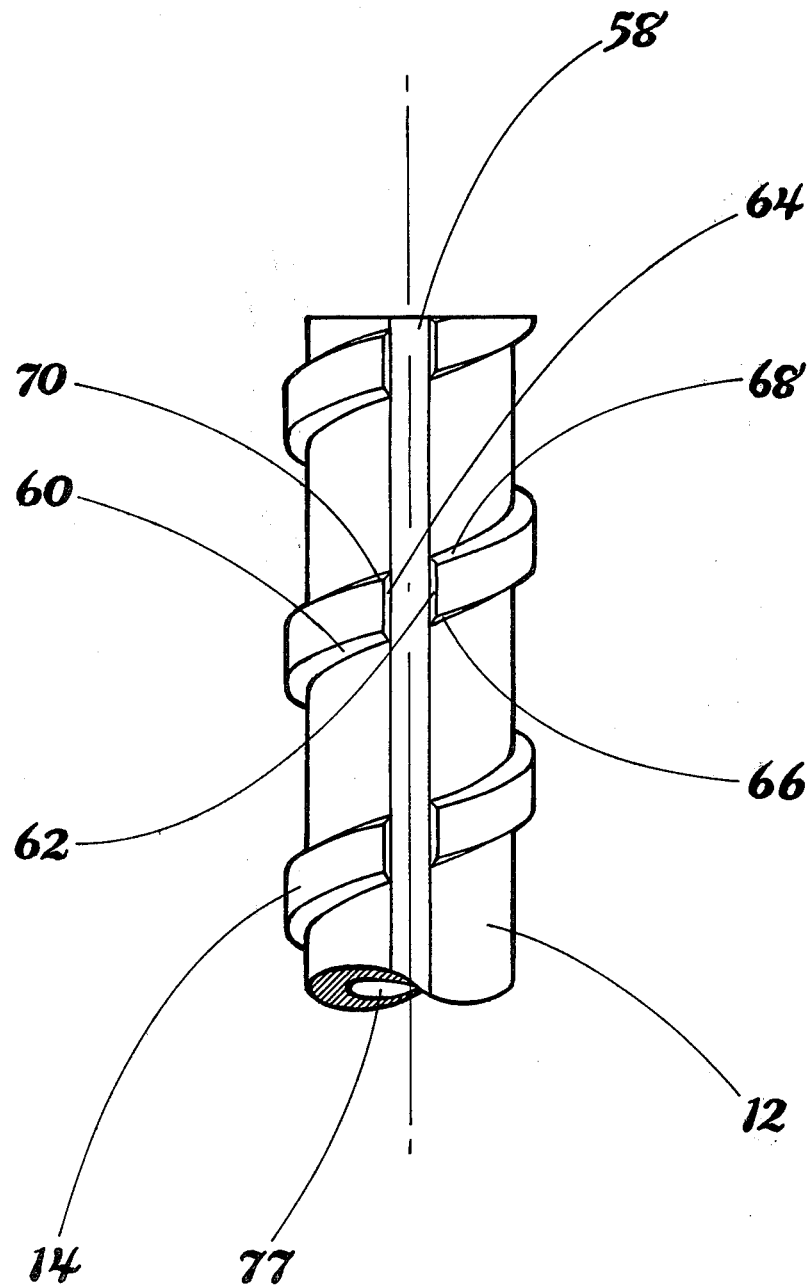
FIG. 3 is a plan view of a part of the drill shaft used in combination with the drive mechanism of FIGS. 1 and 2.

The concept and operation of the drill drive mechanism described above may be better understood from consideration of FIGS. 3, 4, 5 and 6 which show respectively the drill shaft configuration, more detail of the drive link configuration, and a perspective view of a pair of intermeshed but truncated drive links. FIG. 3 shows a section of the drill shaft 12 with a number of the helical projections 14 thereon. These projections are separated by means of an axial groove or notch 58 which thereby exposes a plurality of notch surfaces 62 and 64 at the edges of the notch 58. Helical projections 14 also include lower contact surfaces 60 and 66 and upper contact surfaces 68 and 70.

FIG. 4 is a plan view of one of the several drive links shown in FIG. 1. It is a view looking into the concave center section 36a. In this view are shown the internal grooves which include lower surfaces 72 and 74 which contact surfaces 60 and 66 of helical projections 14 and upper surfaces 76 and 78 which contact the upper surfaces 70 and 68 of projections 14. Thus it will be understood that as link 36 moves upwardly surfaces 72 and 74 will press against surfaces 60 and 66 to carry drill shaft 12 upwardly. Similarly, as link 36 moves downwardly surfaces 76 and 78 will press downwardly on surfaces 70 and 68 of projections 14, thereby carrying drill shaft 12 downwardly. Surfaces 80 and 82 make contact with the notched surfaces 62 and 64 of projections 14 as links 36 are rotated. This operation may be somewhat more clear from consideration of FIG. 5, which is a top view of the link 36 with the drill shaft 12 and the helical projections 14 shown in phantom to indicate their location relative to the interior surface 36a. In this view it appears that surfaces 80 and 82 also form part of a male projection 84 which extends some distance into the groove 58 of drill shaft 12 in addition to providing contact surfaces driving notch surfaces 62 and 64.

The various links 36 include outside edges 86 having bores 88 therethrough which are aligned with bores 90 in the main body of link 36, these bores being aligned with each other and their center line passing approximately through the center of the contact area of the link 36 with the helical projections 14. Pins passing through bores 86 and 90 secure conventional chain links (shown in FIG. 1) spaced by conventional chain roller means which link the various drive links 36 together. A pair of small flanges 92 formed on the outside surface of edge sections 86 include bores 94 which receive cotter pins or other suitable fastening means for securing the pins in bores 88 and 90. It will be observed that flanges 92 have not been shown in FIG. 1, since it was believed that they would tend to obscure rather than aid understanding of the drive mechanism 10.

Figure 6:
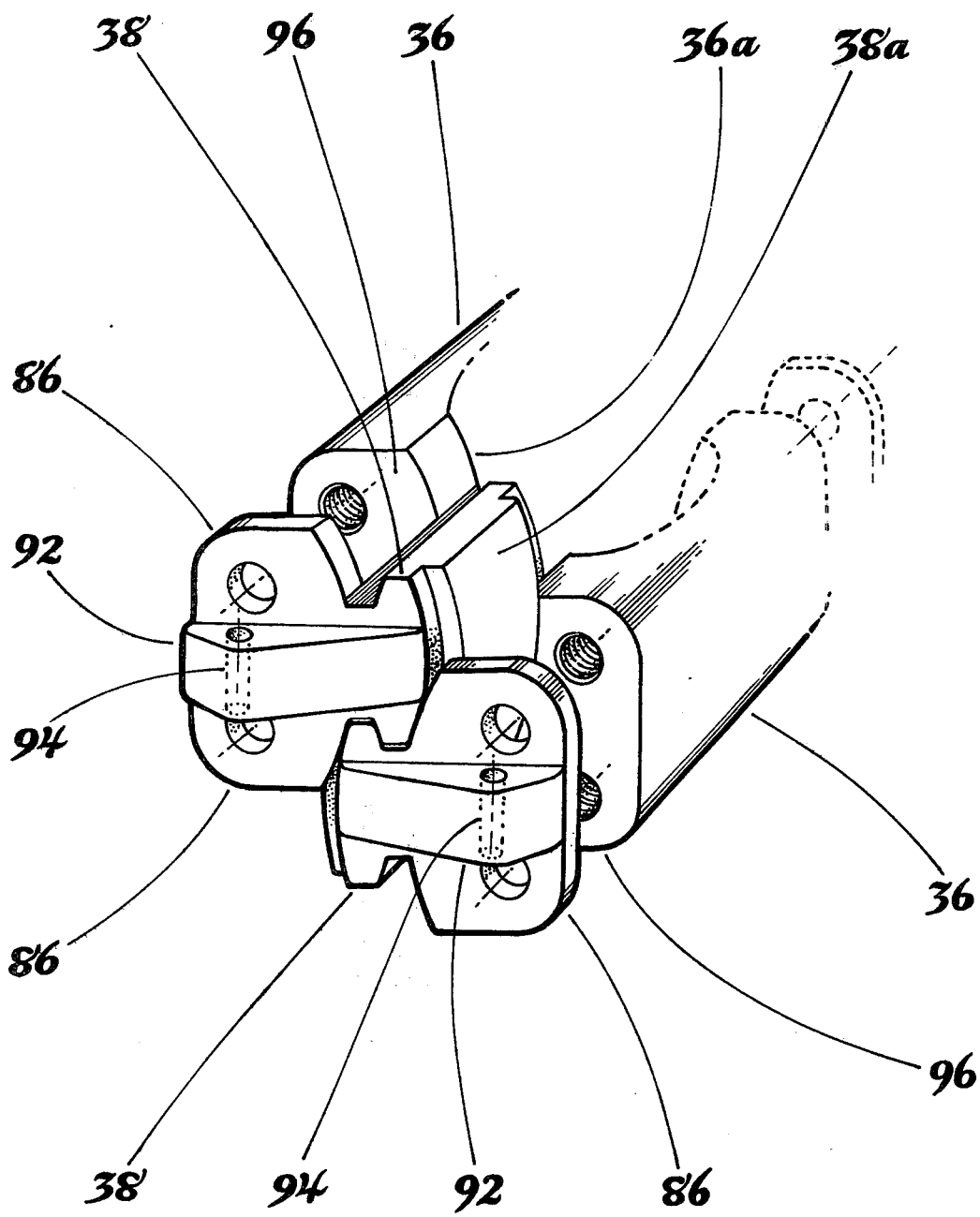
FIG. 6 is an enlarged perspective view of a pair of meshed drive links such as those shown in FIG. 1.

FIG. 6 is a perspective view showing portions of two of the links 36 meshed together. Each of the meshed drive links 36 includes a projection 38 which meshes with similar projections 38 on other drive links. Contours of the edge surfaces of projections 38 are similar to those of gear teeth since they must join together and separate smoothly as the drive chain is operated. These projections 38 also include an inward projection 38a which extends even farther in the direction of the meshing link and into a recess in the meshing link defined by surfaces 96 and 98 (see also FIGS. 3 and 4). By dimensioning projection 38a to substantially take up the space between surfaces 96 and 98, relative lateral movement of the links is effectively prevented, and they will be held in mesh and move into and out of mesh very smoothly. This smooth action is aided by having the pitch diameter of this gear shape in the locking link projections 38, 38a the same as the pitch diameter of the chain sprockets. The corners of projections 38a have been chamfered to aid in this meshing operation. It will be recognized from the foregoing that the described meshing operation of links 36 results in a very firm and secure drive relationship with shaft 12 for either rotational or axial movement thereof.

Figure 7:
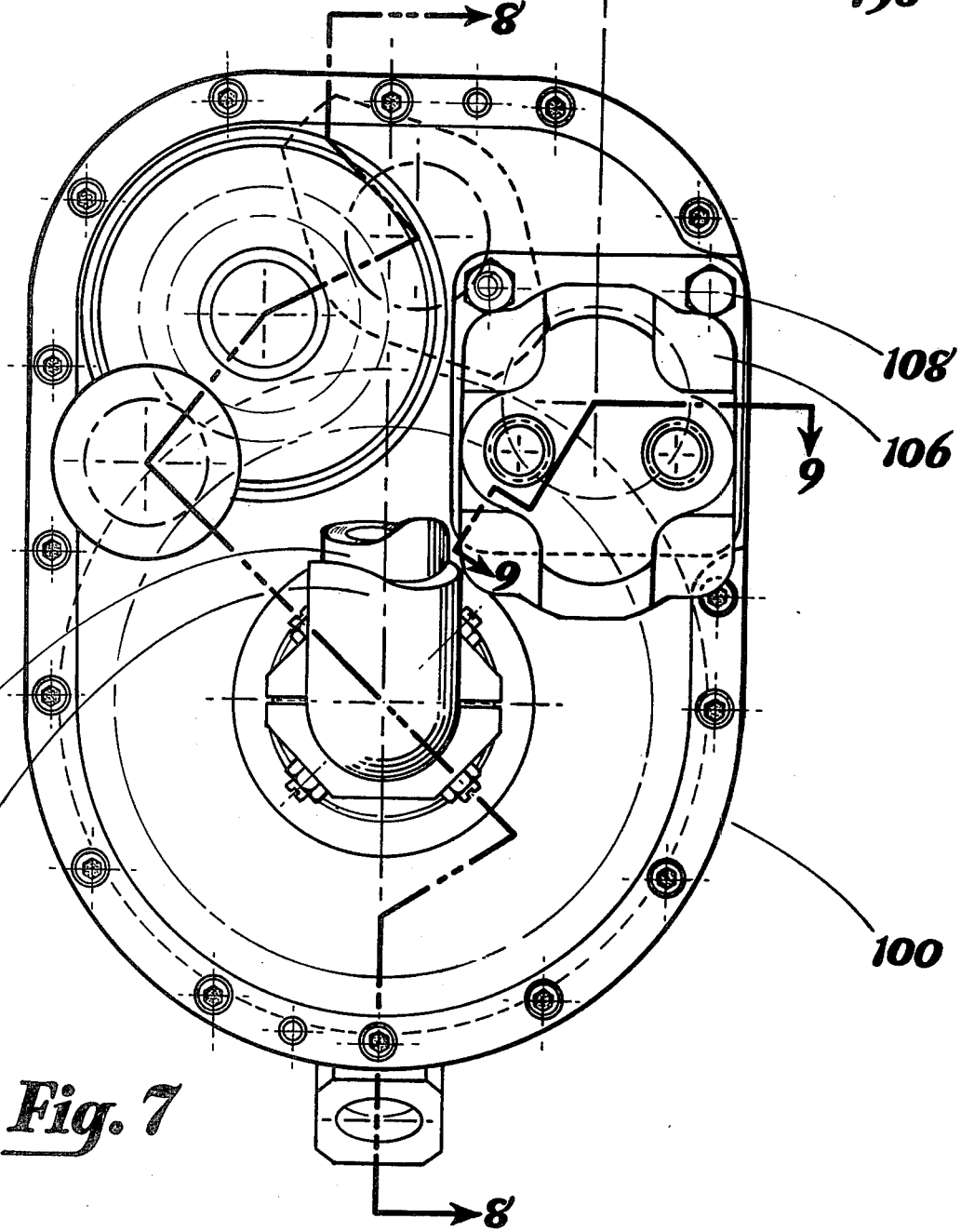
FIG. 7 is a bottom view of the housing of a drill drive assembly 20 incorporating my invention.
Figure 8:
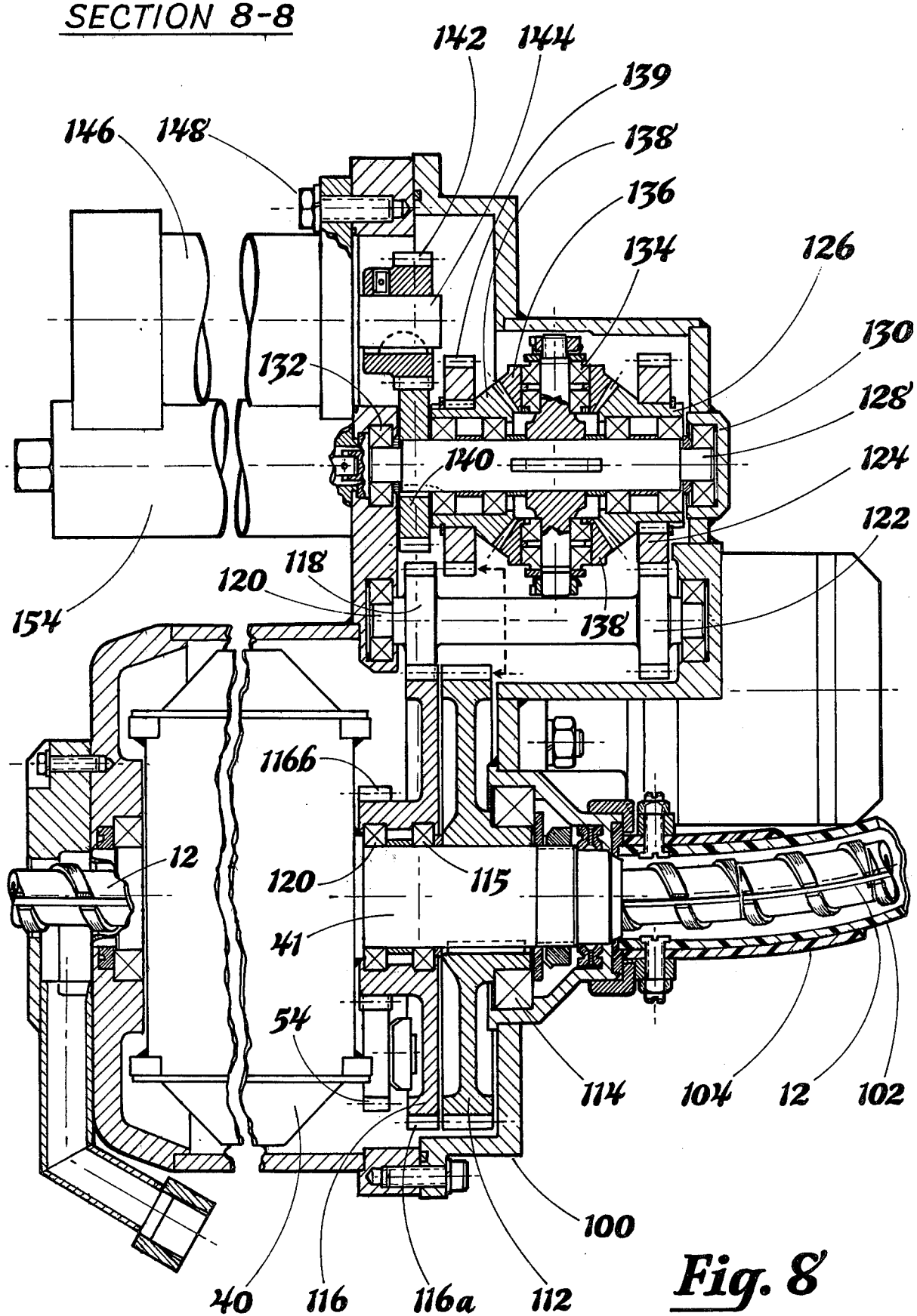
FIG. 8 is a sectional view taken along line 8—8 of FIG. 7.

FIG. 7 is a view from the bottom of the overall housing for my drill drive. This housing, generally identified as numeral 100, shows a drill shaft shroud 102 which is of flexible material, such as rubber, concentrically within a similar flexible sleeve 104, both of which are secured to the housing 100 through conventional fastening means. Also visible in this view is the housing for a hydraulic motor assembly 106 which is attached to the housing with conventional bolts 108. The details of the structure enclosed in housing 100 are more fully delineated in FIG. 8, which is a sectional drawing taken along line 8—8 of FIG. 7. In FIG. 8 the shaft 12 is shown enclosed within flexible sleeves 102 and 104 as it enters the housing 100. Shaft 12 also appears at the top of the drawing, and it is enclosed within housing 40 which contains the drive mechanism previously described. Housing 40 is fastened to a rotatable shaft 41 to which is keyed a large gear 112 supported on bearings 114 carried in housing 100. Located adjacent gear 112 and rotatable relative to shaft 41 is a second large-diameter gear 116 carried on bearings 115 and 120 and which includes a large-diameter set of gear teeth 116a and a smaller-diameter set of gear teeth 116b. Gear teeth 116b mesh with gear 54 which drives the chain sprockets 18 and 22 (FIG. 1) for axial drive of drill shaft 12. The large-diameter gear teeth mesh with a gear 118 carried on a shaft 120. At the opposite end of shaft 120 is a gear 122 which meshes with a spur gear 124 keyed to a bevel gear 126. Bevel gear 126 forms part of a differential gearset which includes a centrally located shaft 128 carried in housing 100 in bearings 130 and 132 and which has keyed to it a spider gear shaft 134 carrying pinion gears 136 and 138 which are engaged with bevel gear 126 and also with an additional bevel gear 138. A spur gear 139 is keyed to bevel gear 138. Also keyed to shaft 128 is a spur gear 140 which engages a spur gear 142 carried on an output shaft 144 from a hydraulic motor 146. Hydraulic motor 146 is fastened to housing 100 through conventional means such as bolts 148.

Figure 9:
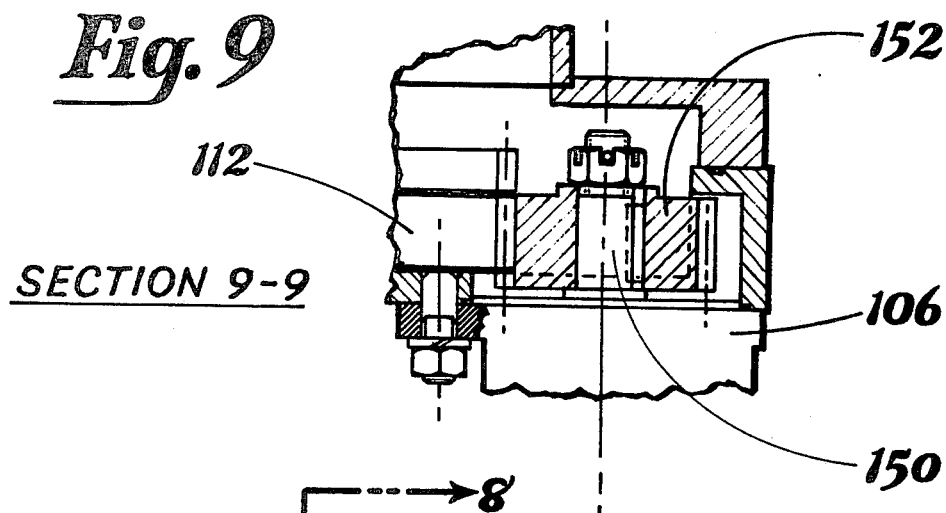
FIG. 9 is a sectional view taken along line 9—9 of FIG. 7.

It will be noted that FIG. 9 is a fragmentary sectional view of a portion of the mechanism of FIG. 7 taken along section line 9—9 of FIG. 7. This section shows the drive means from the motor 106 through its output shaft 150 which is keyed to a spur gear 152 which, in turn, is engaged with the large drive gear 112 which provides rotational movement to housing 40, etc. Drive gear 112 actually engages the spur gear 139 as indicated by the dotted line drawn between them on FIG. 8, thus turning the bevel gear 138 and pinions 136 and 138.

The purpose of the differential drive organization heretofore described is to provide a controllable axial feed for the drill shaft 12 which is coordinated with the rotational drive. In the absence of any input from the axial feed drive motor 146, the large drive gear 112 will be driven directly from the rotational drive motor 106, thereby driving spur gear 139 and its associated bevel gear 138. Pinions 136 and 138 will simply turn in position, and the lower bevel gear 126 and its associated spur gear 124 will then turn at the same speed and in the opposite direction from the direction of rotation of the upper bevel gear 138. Gear 124 will drive spur gear 122 on the end of shaft 120, which drives gear 118 and causes it to rotate gear 116. Since gears 122 and 118 and gears 112 and 116 are the same diameter and pitch, the result is that, in the absence of an axial feed on shaft 128, both of gears 112 and 116 will rotate in the same direction and at the same speed, and there is, therefore, no relative speed differential to cause turning of gear 54.

Suppose now that the axial feed motor 146 turns in such manner as to rotate shaft 128 and the pinions 136 and 138 one rpm. Now the upper and lower bevel gears 138 and 126 will have different speeds by 2 rpm such that, for example, the lower differential gear 128 may be turning 2 rpm faster than the upper gear in the opposite direction. This increase in speed will be transmitted through shaft 120 and spur gear 118 to the large drive gear 116, causing it to rotate somewhat faster than gear 112 and housing 40. This causes a relative speed differential which drives spur gear 54 to cause the chain drive mechanism 10 to be actuated.

Connected directly to the main differential shaft 128 is a depth indicator 154 which gives the operator a direct indication of the depth of the drill shaft in the hole being drilled. Such information is obviously directly related to the axial drive fed into shaft 128 from drive motor 146.

I claim:

1. In a drill and drill drive mechanism wherein said drill includes a shaft with a plurality of helically arranged scroll projections on said shaft and a notch cut axially along the side of said shaft to expose notches between said helical scroll projections,
   a drill drive comprising a housing surrounding said drill shaft, a plurality of sprockets and a pair of chains in said housing carried on and driven by said sprockets, said chains being formed of drive links and conventional intermediate links connecting said drive links, and first gear means driving said sprockets;
   said drive links having concave contact surfaces with tangs extending therefrom mating with said notches between said helical scroll projections, grooves for receiving said helical scroll projections, and linking projections on the outside edges thereof which mate with linking projections on drive links carried on the opposite of said two chains to hold said drive links tightly around and in mesh with said drive shaft;
   drive means connected to said housing including a drive shaft and second gear means pinned to said drive shaft,
   first motor means connected to said second gear means,
   third gear means coaxial with and rotatable relative to said second gear means including a large diameter gear and a smaller diameter gear connected to drive said first gear means,
   a differential gearset including first and second bevel gears arranged for differential rotation and first and second spur gears pinned to said first and second bevel gears, respectively, said second spur gear being in mesh with said second gear means;
   a gear shaft including a third spur gear meshed with said large diameter gear and a fourth spur gear meshed with said first spur gear; and
   second motor means connected to said differential gearset to produce differential operation of said gearset and hence a differential in the rotational speeds of said second and third gear means to rotate said first gear means to drive said sprockets.

2. A drill drive mechanism as set forth in claim 1 wherein said large diameter gear is of the same diameter as said second gear means whereby both said second and third gear means rotate at the same speed in the absence of an input from said second motor means.

3. A drill drive mechanism as set forth in claim 1 wherein a gauge is connected to said second motor means to indicate the amount of axial movement of said drill shaft.

4. A drill drive mechanism as set forth in claim 1 wherein the linking projections of said drive links are contoured like gear teeth to aid in smooth meshing of said drive links.

5. A drill drive mechanism as set forth in claim 1 wherein said differential gearset includes a spider shaft, pinion gears are carried on said spider shaft in mesh with said bevel gears, and said second motor means is connected to said spider shaft to produce differential operation of said bevel gears.

6. A drill drive mechanism as set forth in claim 1 wherein said drive links also include mating projections extending outwardly a greater distance than said linking projections and corresponding depressions which permit said mating projections to occupy space in the depressions of the drive links of the opposite of said two chains to inhibit lateral movement of said link when interlinked around said drill shaft.

7. A drill drive mechanism as set forth in claim 1 wherein said drive links are connected to said intermediate links by means of pivot pins and the axis of rotation of said pivot pins passes approximately through the center of the contact area of said drive link with said scroll projections.

8. In a drill and drill drive mechanism wherein said drill includes a shaft with a plurality of helically arranged scroll projections on said shaft and a notch cut axially along the side of said shaft to expose notches between said helical scroll projections,
   a drill drive comprising a housing surrounding said drill shaft, a plurality of sprockets including drive sprockets and a pair of chains in said housing carried on and driven by said sprockets, said chains being formed of drive links and conventional intermediate links connecting said drive links, and first gear means driving said drive sprockets;
   said drive links having concave contact surfaces with tangs extending therefrom mating with said notches between said helical scroll projections, grooves for receiving said helical scroll projections, and linking projections on the outside edges thereof which mate with linking projections on drive links carried on the opposite of said two chains to hold said drive links tightly around and in mesh with said drive shaft;
   a transmission connected to said housing including a hollow shaft connected to said housing and essentially concentric with said drill shaft, a second gear means connected to said hollow shaft and first motor means connected to said second gear means, third gear means coaxial with said second gear means and rotatable relative to said second gear means, said third gear means including a large diameter gear and a small diameter gear connected to drive said first gear means, a differential gearset including a main shaft, a spider shaft pinned to said main shaft, a pair of pinion gears carried on said spider shaft and first and second bevel gears carried on said main shaft but rotatable relative thereto, said bevel gears each being in mesh with said pinion gears, first and second spur gears pinned to said first and second bevel gears respectively with said first spur gear being in mesh with said second gear means, a third spur gear pinned to said main shaft and second motor means connected to drive said third spur gear, a shaft including fourth and fifth spur gears, said fourth spur gear being in mesh with said large diameter gear and said fifth spur gear being in mesh with said second spur gear;

such that said drill shaft is rotated by operating said first motor means to drive second second gear means, said first spur gear and bevel gear and through said pinion gears, said second bevel gear and second spur gear, said fourth and fifth spur gears and said second gear means, and axial drive is effected by operating said second motor means to turn said third spur gear and said main shaft to produce a differential in the speeds of said first and second bevel gears, hence a differential in the speeds of said second and third gear means which results in driving said first gear means to drive said drive sprockets.

9. In a drill and drill drive mechanism wherein said drill includes a shaft with a plurality of helically arranged scroll projections on said shaft and a notch cut axially along the side of said shaft to expose notches between said helical scroll projections:

a drill drive comprising a housing, a pair of chains in said housing formed of drive links and conventional intermediate links and drive means for driving said chains, said drive links having concave contact surfaces with tangs extending therefrom mating with said notches between said helical scroll projections, grooves for receiving said helical scroll projections, and linking projections on the outside edges thereof which mate with linking projections on drive links carried on the opposite of said two chains to hold said drive links tightly around and in mesh with said drive shaft;

and motor means connected to said housing for rotating said housing to rotate said shaft.

10. A drill and drill drive mechanism as set forth in claim 9 wherein a differential gearset is connected to said drill drive and a second motor means is included for effecting axial feed of said drill shaft, said second motor means being connected to said differential gearset.

11. A drill and drill drive mechanism as set forth in claim 9 wherein a second motor means is connected to said drive means for effecting axial feed of said drill shaft.

* * * * *